US012749397B2

(12) United States Patent
Vijaya Kumar et al.

(10) Patent No.: US 12,749,397 B2
(45) Date of Patent: Sep. 29, 2026

(54) VEHICLE SYSTEMS AND METHODS FOR IDENTIFICATION AND DEDUPLICATION OF ROADWAY OBJECTS

(71) Applicant: GM GLOBAL TECHNOLOGY OPERATIONS LLC, Detroit, MI (US)

(72) Inventors: Vivek Vijaya Kumar, Shelby Township, MI (US); Abdulrahman Al-Shanoon, Toronto (CA); Mason David Gemar, Cedar Park, TX (US); Joon Hwang, Pflugerville, TX (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 44 days.

(21) Appl. No.: 18/828,956

(22) Filed: Sep. 9, 2024

(65) Prior Publication Data

US 2026/0073791 A1 Mar. 12, 2026

(51) Int. Cl.

*G08G 1/0967* (2006.01)
*G06F 18/23* (2023.01)
*G08G 1/01* (2006.01)

(52) U.S. Cl.

CPC ....... *G08G 1/096725* (2013.01); *G06F 18/23* (2023.01); *G08G 1/0112* (2013.01); *G08G 1/096791* (2013.01)

(58) Field of Classification Search

CPC ........... G08G 1/096725; G08G 1/0112; G08G 1/096791; G06F 18/23; G06F 16/35; G06F 16/285; G06F 18/217; G06V 10/30
See application file for complete search history.

(56) References Cited

U.S. PATENT DOCUMENTS

2011/0213583 A1* 9/2011 Mao ........................ G01S 19/37 707/E17.089
2019/0205674 A1* 7/2019 Silver .................. G05D 1/0088
2019/0325235 A1* 10/2019 Stenneth ............... G06F 18/217
2020/0050973 A1* 2/2020 Stenneth ............ G01C 21/3815
2020/0193194 A1* 6/2020 Zhang ................... G06F 18/217
2021/0335132 A1* 10/2021 Zhang .................. G06V 20/582
(Continued)

FOREIGN PATENT DOCUMENTS

WO WO-2020238011 A1 * 12/2020 ............. G06F 17/12

OTHER PUBLICATIONS

Machine translation of WO2020238011A1 (Year: 2020).*
German Office Action from counterpart DE1020241324066, dated Mar. 14, 2025.

*Primary Examiner* — Scott A Browne
*Assistant Examiner* — Jisun Choi

(57) ABSTRACT

A vehicle system includes a vehicle control module of a vehicle and a control module. The control module is configured to receive data from vehicles over a period of time, cluster the received data into groups, detect at least one set of duplicate groups of the groups, merge the duplicate groups into a single group or remove at least one of the duplicate groups to form a set of deduplicated groups associated with the at least one object, and determine an expected location of the at least one object based on the set of deduplicated groups. The vehicle control module is configured to receive the expected location of the at least one object and generate a control signal for controlling at least one operation of the vehicle based on the expected location of the at least one object. Other example systems and methods are also disclosed.

20 Claims, 13 Drawing Sheets

(56) References Cited

U.S. PATENT DOCUMENTS

| | | | | |
|---|---|---|---|---|
| 2022/0176957 | A1* | 6/2022 | Tamilarasan | G05D 1/0231 |
| 2023/0267176 | A1* | 8/2023 | Wang | G06F 16/906<br>707/722 |
| 2024/0182045 | A1 | 6/2024 | Vijaya Kumar et al. | |
| 2024/0201699 | A1* | 6/2024 | Raghav | G05D 1/0038 |
| 2024/0383482 | A1* | 11/2024 | Boydston | G01S 17/931 |

* cited by examiner

VEHICLE SYSTEMS AND METHODS FOR IDENTIFICATION AND DEDUPLICATION OF ROADWAY OBJECTS

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to vehicle systems and methods for identification and deduplication of roadway objects.

Vehicles often rely on maps for vehicle control and/or display. The maps may be generated through crowdsourcing algorithms that aggregate and group data collected over time from multiple vehicles. For example, vehicles may collect data via one or more vehicle sensors (e.g., cameras, etc.) while traveling along a particular stretch of a roadway. Such data may include location data of various objects (e.g., traffic signs, billboards, rocks, potholes, roadside vehicles, etc.), speed limit data on traffic signs, etc. A system receives the collected data from the vehicles and data from other sources (e.g., aerial imaginary, etc.), aggregates and groups the data, analyzes the data to identify locations and/or other details related to objects along roadways, and then generates maps based on the analyzed data. The maps and the details related to objects along the roadways may then be provided to individual vehicles (e.g., in real time) to enable each vehicle to be controlled and/or display such maps and details.

SUMMARY

A vehicle system includes a vehicle control module of a vehicle and a control module in communication with the vehicle control module. The control module is configured to receive data from a plurality of vehicles over a period of time, the data including detected locations of at least one object along a vehicle roadway, cluster the received data into a plurality of groups, detect at least one set of duplicate groups of the plurality of groups, merge the duplicate groups into a single group or remove at least one of the duplicate groups to form a set of deduplicated groups associated with the at least one object, and determine an expected location of the at least one object based on the set of deduplicated groups. The vehicle control module is configured to receive the expected location of the at least one object and generate a control signal for controlling at least one operation of the vehicle based on the expected location of the at least one object.

In other features, the control module is configured to merge the duplicate groups into the single group by averaging latitude values and longitude values.

In other features, the control module is configured to remove the at least one of the duplicate groups based on a number of the plurality of vehicles detecting locations of the at least one object or a sampling frequency of the plurality of vehicles detecting locations of the at least one object.

In other features, the control module is configured to determine a weighted value associated with each group from the set of duplicate groups and remove the at least one of the duplicate groups based on the weighted value and a threshold.

In other features, the weighted value associated with each group is based on a standard deviation of locations of the object specific to the group, a standard deviation of headings of the object specific to the group, and a standard deviation of elevations of the object specific to the group.

In other features, the at least one object is a traffic sign and the data includes information on the traffic sign.

In other features, the information on the traffic sign includes speed limit values.

In other features, the control module is configured to identify a contradiction between one or more of the speed limit values of the traffic sign and determine an expected speed limit value based on a number of previous contradictions for the traffic sign.

In other features, the control module is configured to determine if a speed limit value of the speed limit values is within a defined threshold of a typical detected speed for the vehicle roadway and select the speed limit value as an expected speed limit value of the speed limit sign.

In other features, the control module is configured to determine if a speed limit value of the speed limit values is within a defined threshold of a typical speed limit for a plurality of roadways including the vehicle roadway and select the speed limit value as an expected speed limit value of the speed limit sign.

In other features, the control module is external to the vehicle.

In other features, the control module is configured to transmit the expected location of the at least one object to a plurality of vehicle control modules including the vehicle control module.

A vehicle system includes a vehicle control module of a vehicle and a control module in communication with the vehicle control module. The control module is configured to receive data from a plurality of vehicles over a period of time, the data including detected locations and speed limit values of at least one speed limit sign along a vehicle roadway, cluster the received data into a plurality of groups, detect at least one set of duplicate groups of the plurality of groups, merge the duplicate groups into a single group or remove at least one of the duplicate groups to form a set of deduplicated groups associated with the at least one speed limit sign, determine an expected speed limit value of the at least one speed limit sign based on the set of deduplicated groups, and determine an expected location of the at least one speed limit sign based on the set of deduplicated groups. The vehicle control module is configured to receive the expected speed limit value and the expected location of the at least one speed limit sign and generate a control signal for controlling at least one operation of the vehicle based on the expected speed limit value and the expected location of the at least one speed limit sign.

In other features, the control module is configured to identify a contradiction between one or more of the received speed limit values of the at least one speed limit sign.

In other features, the control module is configured to determine the expected speed limit value based on a number of previous contradictions for the at least one speed limit sign.

In other features, the control module is configured to determine if a speed limit value of the received speed limit values is within a defined threshold of a typical detected speed for the vehicle roadway and select the speed limit value as the expected speed limit value of the at least one speed limit sign.

In other features, the control module is configured to determine if a speed limit value of the received speed limit values is within a defined threshold of a typical speed limit for a plurality of roadways including the vehicle roadway and select the speed limit value as the expected speed limit value of the at least one speed limit sign.

A vehicle control method includes receiving data from a plurality of vehicles over a period of time, the data including detected locations of at least one object along a vehicle roadway, clustering the received data into a plurality of groups, detecting at least one set of duplicate groups of the plurality of groups, merging the duplicate groups into a single group or removing at least one of the duplicate groups to form a set of deduplicated groups associated with the at least one object, determining an expected location of the at least one object based on the set of deduplicated groups, and generating a control signal for controlling at least one operation of a vehicle based on the expected location of the at least one object.

In other features, merging the duplicate groups into the single group includes averaging latitude values and longitude values for the duplicate groups.

In other features, removing the at least one of the duplicate groups includes removing the at least one of the duplicate groups based on a number of the plurality of vehicles detecting locations of the at least one object or a sampling frequency of the plurality of vehicles detecting locations of the at least one object.

In other features, removing the at least one of the duplicate groups includes determining a weighted value associated with each group from the set of duplicate groups, the weighted value associated with each group is based on a standard deviation of locations of the object specific to the group, a standard deviation of headings of the object specific to the group, and a standard deviation of elevations of the object specific to the group.

In other features, removing the at least one of the duplicate groups based on the weighted value and a threshold.

In other features, the at least one object is a speed limit sign and the data includes speed limit values of the speed limit sign.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Vehicles often rely on maps for vehicle control and/or display. The maps may be generated through crowdsourcing algorithms that aggregate and group data collected over time via sensors from multiple vehicles. In some cases, however, different vehicles may report different locations for a given object (e.g., a traffic sign) due to the vehicles' position when detecting the object and/or sensor bias. Additionally, one vehicle may report different locations (e.g., on the same or different trips) for a given object due to a positioning error of the vehicle, a detection error of a sensor (e.g., a camera) of the vehicle, environmental factors (e.g., fog conditions, rain, snow, etc.), etc. Often, the reported locations for a given object are close to each other and may be aggregated and grouped effectively. However, where the reported locations for a given object are spread out, grouping of the data may result in duplicate groups (e.g., clusters). Further, in some instances, collected data may include a combination of true and false positive object detections or contradictions. For instance, the collected data (from the same or different vehicles) may include speed limit values of 35 MPH and 85 MPH for a single traffic sign in a residential area (e.g., a low-speed area). Such data contradictions and duplicate groups may lead to inefficiencies of computing resources, and ambiguities and reduced confidence in the objects for the maps and vehicle control.

The vehicle systems and methods according to the present disclosure provide solutions for efficiently identifying duplicate groups (e.g., clusters), identifying contradictions in collected data, and then resolving such duplicate groups and contradictions. For example, and as further explained herein, the vehicle systems and methods may dynamically detect duplicate road objects (e.g., traffic signs, etc.) produced from crowdsourcing information from multiple vehicles, and then identify certain duplicates that can be merged and others that can be dropped, thereby improving the quality of the crowdsourced object database. Further, the vehicle systems and methods may dynamically identify contradicting data relating to road objects that are close to each other and then identify true/false positives of the contradicting data. As a result, locations and details of objects along roadways are accurately identified and relied upon for map generation and vehicle control.

Figure 1:
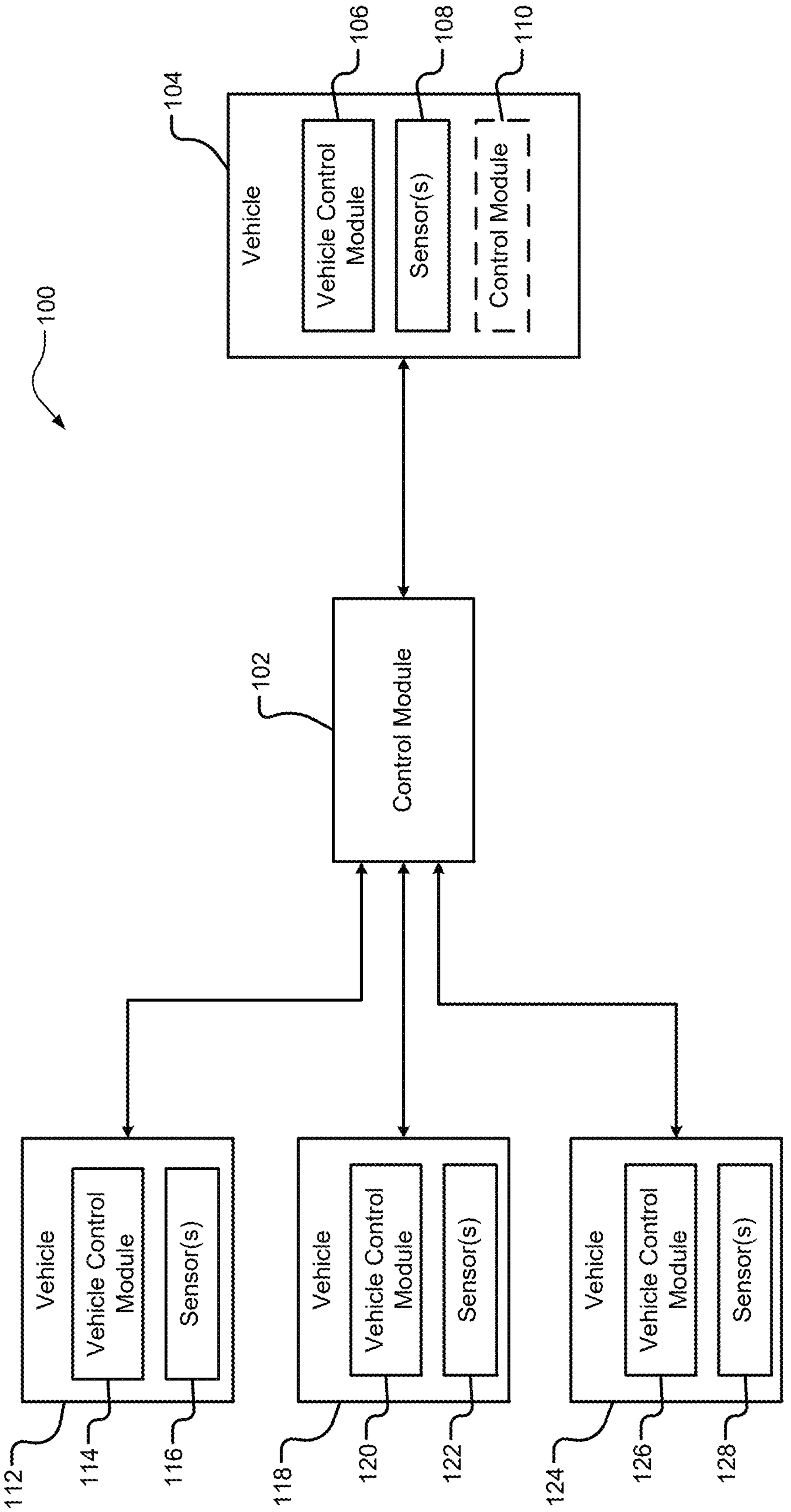
FIG. 1 is a block diagram of an example vehicle system including multiple vehicle control modules and a control module, according to the present disclosure.

Referring now to FIG. 1, a block diagram of an example vehicle system 100 is shown. The vehicle system 100 generally includes a control module 102 and vehicle control modules 106, 114, 120, 126 located in vehicles 104, 112, 118, 124, respectively. Additionally, each vehicle 104, 112, 118, 124 includes one or more sensors 108, 116, 122, 128, respectively. In such examples, the sensors 108, 116, 122, 128 may collect data representing characteristics of objects along roadways. Although FIG. 1 illustrates the vehicle system 100 as including specific modules, it should be appreciated that one or more other modules may be employed if desired.

In various embodiments, the modules and sensors of the vehicle system 100 may be in communication with each other and may share parameters via one or more networks. For example, each vehicle 104, 112, 118, 124 may include a local network, such as a controller area network (CAN) for communication between respective sensors and vehicle control modules. As such, various data may be made available by a given module and/or sensor to other modules and/or sensors in each respective vehicle via its local network (e.g., one or more data buses of the network). Additionally, each vehicle 104, 112, 118, 124 may be in communication with the control module 102 via another network (e.g., a cellular network, etc.). In such examples, the vehicle control modules 106, 114, 120, 126 (or another suitable control module) of the vehicles 104, 112, 118, 124 may include a transmitter and a receiver for communicating with the control module 102. As such, data collected by any one of the sensors 108, 116, 122, 128 may be shared internally (e.g., within a respective vehicle) and/or externally with the control module 102.

In the example of FIG. 1, the sensors 108, 116, 122, 128 may include any suitable sensor for detecting one or more characteristics of objects along roadways. For example, the sensors 108, 116, 122, 128 may include cameras, radar sensors, etc. Additionally, the objects may include any suitable object on a road or near a road, such as traffic signs, billboards, pavement markings, rocks, potholes, roadside vehicles, construction zones, etc. The traffic signs may include, for example, speed limit signs, yield signs, stop signs, merge signs, etc.

In various embodiments, data from the sensors 108, 116, 122, 128 may represent characteristics of the objects. In such examples, the characteristics may include locations (e.g., location data) of the objects, information presented on the objects (e.g., speed limit values, upcoming road events, etc.).

Figure 2:
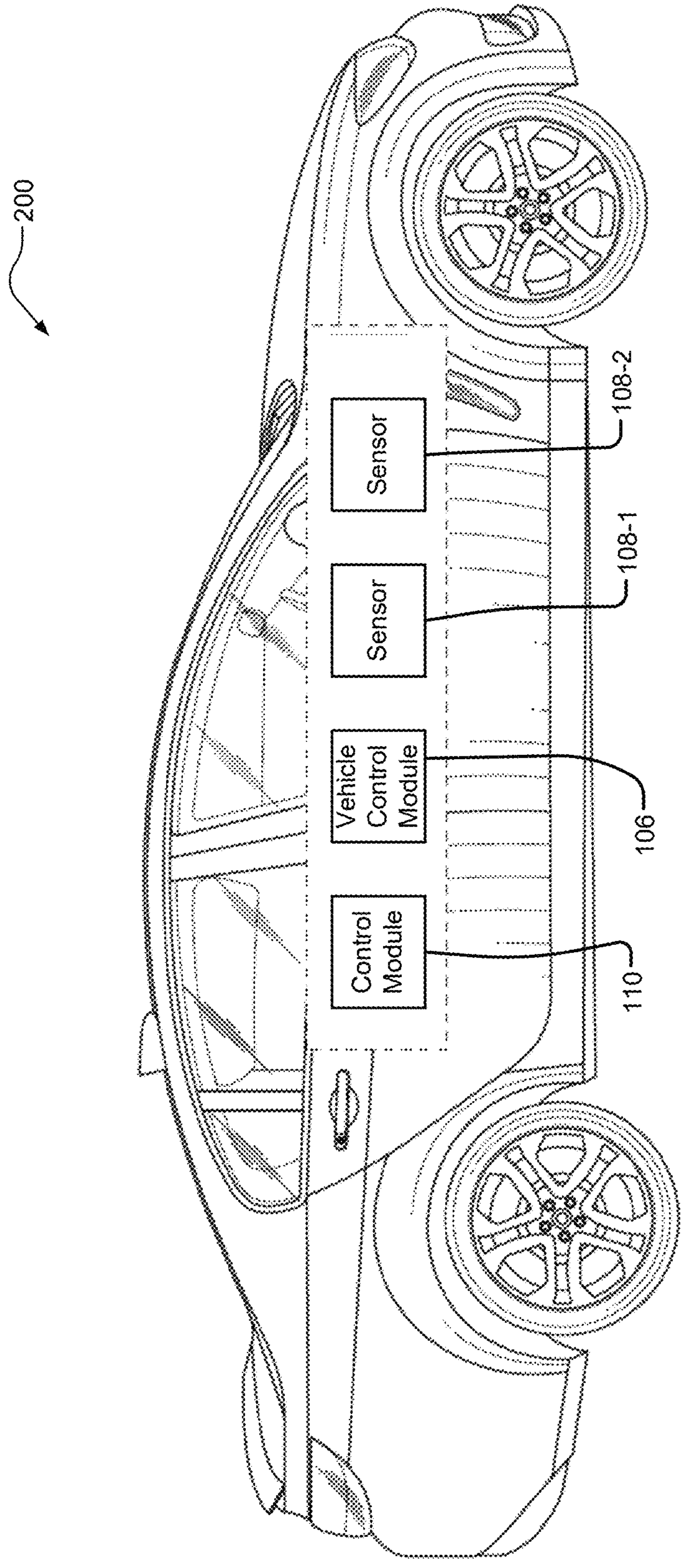
FIG. 2 is a vehicle including portions of the vehicle system of FIG. 1, according to the present disclosure.

The vehicle system 100 of FIG. 1 may be employable in any suitable vehicle, such as an electric vehicle (e.g., a pure electric vehicle, a plug-in hybrid electric vehicle, etc.), an internal combustion engine vehicle, etc. Additionally, the vehicle system 100 may be applicable to an autonomous vehicle, a semi-autonomous vehicle, etc. For example, FIG. 2 depicts a vehicle 200 including the vehicle control module 106, the sensors 108 (shown as sensors 108-1, 108-2 in FIG. 2), and the control module 110 of FIG. 1. In the example of FIG. 2, the sensors 108-1, 108-2 may be cameras.

In various embodiments, the vehicle system 100 of FIG. 1 may utilize the control module 102 to implement the features explained herein. In such examples, the control module 102 may be an external module (e.g., external to the vehicles 104, 112, 118, 124) and/or implemented with cloud computing. For example, and as further explained below, the control module 102 may collect data for objects along roadways from one or more of the vehicles 104, 112, 118, 124 (and/or other vehicles not shown), cluster the collected data into groups (e.g., clusters), detect or otherwise identify duplicate groups in the groups, and implement a deduplication process to resolve some or all of the duplicate groups. Then, in various embodiments, the control module 102 may determine expected locations of the objects. The expected locations and/or maps with the expected locations may then be transmitted to one or more of the vehicles 104, 112, 118, 124 (and/or other vehicles not shown) for use in vehicle control applications.

Alternatively, some or all of the features explained herein may be implemented with a control module in one or more of the vehicles 104, 112, 118, 124. For example, and as shown in FIG. 1, the vehicle 104 includes a control module 110 shown in dashed lines. The control module 110 may perform some or all of the features explained below relative to the control module 102.

Figure 3:
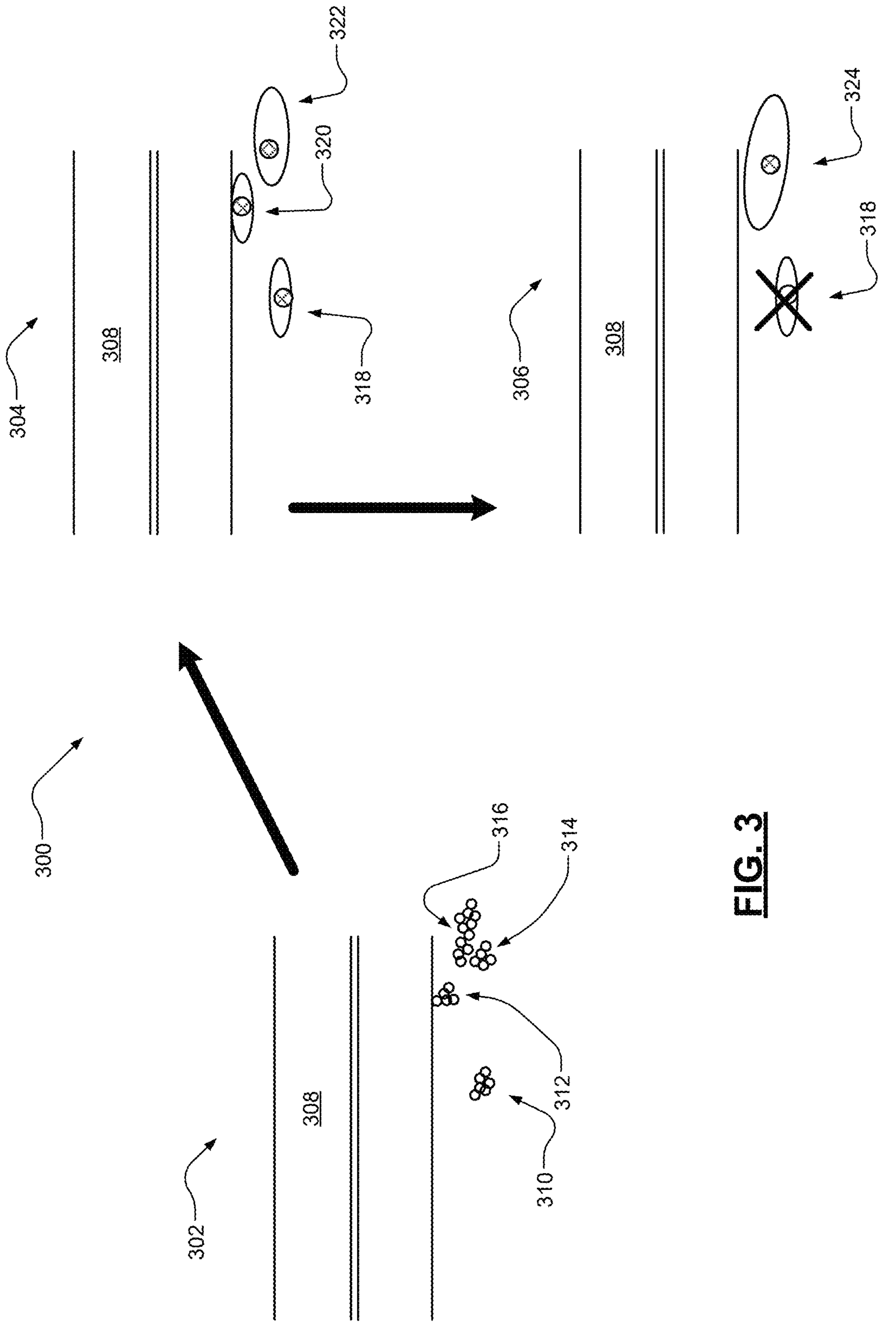
FIG. 3 is a block diagram of an example method for implementing a deduplication process with the vehicle system of FIG. 1, according to the present disclosure.

For example, FIG. 3 depicts a method 300 for implementing a deduplication process with the control module 102 of FIG. 1. As shown, the method 300 generally includes steps 302, 304, 306. At step 302, the control module 102 receives data including detected locations of an object along a vehicle roadway 308 over a period of time. The collected data may be considered crowdsourced data received from multiple vehicles, such as the vehicles 104, 112, 118, 124 of FIG. 1 and/or additional vehicles if desired.

In some examples, the data may be collected in sets for specified periods of time, which may be referred to as detection occurrences. For example, each detection occurrence may represent a data set collected for a specific time period. As examples only, a first detection occurrence may occur on day A at time period B, a second detection occurrence may occur on day C at time period D, a third detection occurrence may occur on day E at time period F, etc. Each detection occurrence may include a detection count representing the number of vehicle passes for the specific time period. For instance, the first detection occurrence may have a detection count of 85 vehicles passes, the second detection occurrence may have a detection count of 305 vehicles passes, and the third detection occurrence may have a detection count of 20 vehicles passes.

In the example of FIG. 3 at step 302, the collected data is shown as data sets 310, 312, 314, 316. In this example, each data set 310, 312, 314, 316 may represent data collected from a different vehicle over one detection occurrence or multiple detection occurrences, a different detection occurrence (e.g. multiple vehicles at a specific period of time), etc.

Then, at step 304, the collected data from the data sets 310, 312, 314, 316 are clustered into three groups (or clusters) 318, 320, 322 via a conventional clustering algorithm. For example, the clustering algorithm may group the received data into different clusters in which data in one cluster (or group) are more similar to each other than another cluster (or group). In this example, the data set 310 is clustered into the group 318, the data set 312 is clustered into the group 320, and the data sets 314, 316 are clustered into the group 322. In FIG. 3, each group 318, 320, 322 is shown with a centroid. As example only, the clustering algorithm may implement density-based clustering, centroid-based clustering, k-means clustering, etc. based on detected locations.

At step 306, the groups 318, 320, 322 (e.g., clusters) are analyzed with a deduplication process to detect duplicate groups. For example, the control module 102 may compare location data in the groups 318, 320, 322, and determine that a group/cluster is near another group/cluster, thereby rendering the groups/clusters as duplicate groups. Then, the control module 102 may invoke different actions to resolve some or all of the duplicate groups to form a set of deduplicated groups associated with the object. For example, in the example of FIG. 3, the group 318 is removed as shown in step 306, and the groups 320, 322 are merged into a group 324. This creates one or more deduplicated groups (e.g., the group 324) associated with the object along a roadway 308.

In various embodiments, the control module 102 may merge duplicate groups into a single group in any suitable manner. For example, if centroids, boundaries, etc. of the duplicate groups (or clusters) are near each other (e.g., within a distance threshold apart), the groups may be merged. In such examples, the control module 102 may merge the duplicate groups into a single group by averaging latitude values and longitude values in the groups for the object.

Additionally and/or alternatively, the control module 102 may remove at least one of the groups from the duplicate groups in any suitable manner. For example, if centroids, boundaries, etc. of the duplicate groups (or clusters) are not near each other (e.g., greater than a distance threshold apart), one or more of the groups may be removed.

In other embodiments, the control module 102 may merge and/or remove duplicate groups based on one or more characteristics associated with the detection occurrences in which data is collected. For example, the control module 102 may remove one of the duplicate groups based on a number of vehicles detecting locations of the object and/or based on a sampling frequency of the vehicles detecting locations of the object. For instance, if the first detection occurrence includes clustered data for the object from 85 vehicles traveling along the vehicle roadway 308 and the second detection occurrence includes clustered data for the object from 305 vehicles traveling along the vehicle roadway 308, the control module 102 may remove (or disregard) the clustered data from the first detection occurrence.

If, however, the first detection occurrence and the second detection occurrence include clustered data from the same number of vehicles (e.g., 100), the control module 102 may look to a sampling count (e.g., a frequency of samples) of the vehicles to determine if removal is appropriate. For instance, if the first detection occurrence includes a sampling count of 50 data samples per vehicle and the second detection occurrence includes a sampling count of 150 data samples per vehicle, the control module 102 may remove (or disregard) the clustered data from the first detection occurrence.

In other embodiments, the control module 102 may merge and/or remove duplicate groups based on weighted values for the groups. For example, a weighted function may be employed to predict which groups are most accurate and therefore should be relied upon. Equation (1) below is one example of a weighted function that may be implemented. In Equation (1), $f(D_i)$ represents a function of the normalized detection counts (e.g., the number of vehicle passes for a given period), $f(S_i)$ represents a function of the normalized sample count (e.g., the number of samples collected per vehicle per pass for the given period), $f(P_{sd_i})$ represents a function of the standard deviation of the object (e.g., a traffic sign) locations, $f(H_{sd_i})$ represents a function of the standard deviation of the heading of the object, and $f(E_{sd_i})$ represents a function of the standard deviation of the elevation of the object.

$$\text{Weight}_{Factor}(w_i) = f(D_i) + f(S_i) + f(P_{sd_i}) + f(H_{sd_i}) + f(E_{sd_i}) \quad \text{Equation (1)}$$

In various embodiments, the control module 102 may remove a group from the duplicate groups based on the weighted factor or value $W_i$ and a threshold. For example, if the value $W_i$ for a particular group is less than a threshold ($W_{min}$), the group may be removed or discarded. Additionally, the control module 102 may perform a weighted average on the remaining groups to determine a fused or merged location.

With continued reference to FIG. 1, the control module 102 and/or the control module 110 may utilize the data from the deduplicated groups to determine an expected location of the object (e.g., the traffic sign, etc.). For example, the control module 102 and/or the control module 110 may implement one or more models (e.g., linear regression models, etc.) to predict an expected location of a speed limit sign or another suitable object based on a set of deduplicated groups. In such examples, a model may be generated and implemented to obtain a longitudinal coordinate of the expected location, and another model may be generated and implemented to obtain a lateral coordinate of the expected location.

Additionally, and as further explained below, the control module 102 may further detect or otherwise identify contradictions in the collected data (e.g., conflicting speed limit values, etc. for a single sign), and implement a resolution process to resolve some or all of the contradictions. Then, the control module 102 may determine expected information on the objects (e.g., a speed limit value). The expected information (along with the expected locations from above) and/or maps with the expected information (and locations) may then be transmitted to one or more of the vehicles 104, 112, 118, 124 (and/or other vehicles not shown) for use in vehicle control applications.

Figure 4:
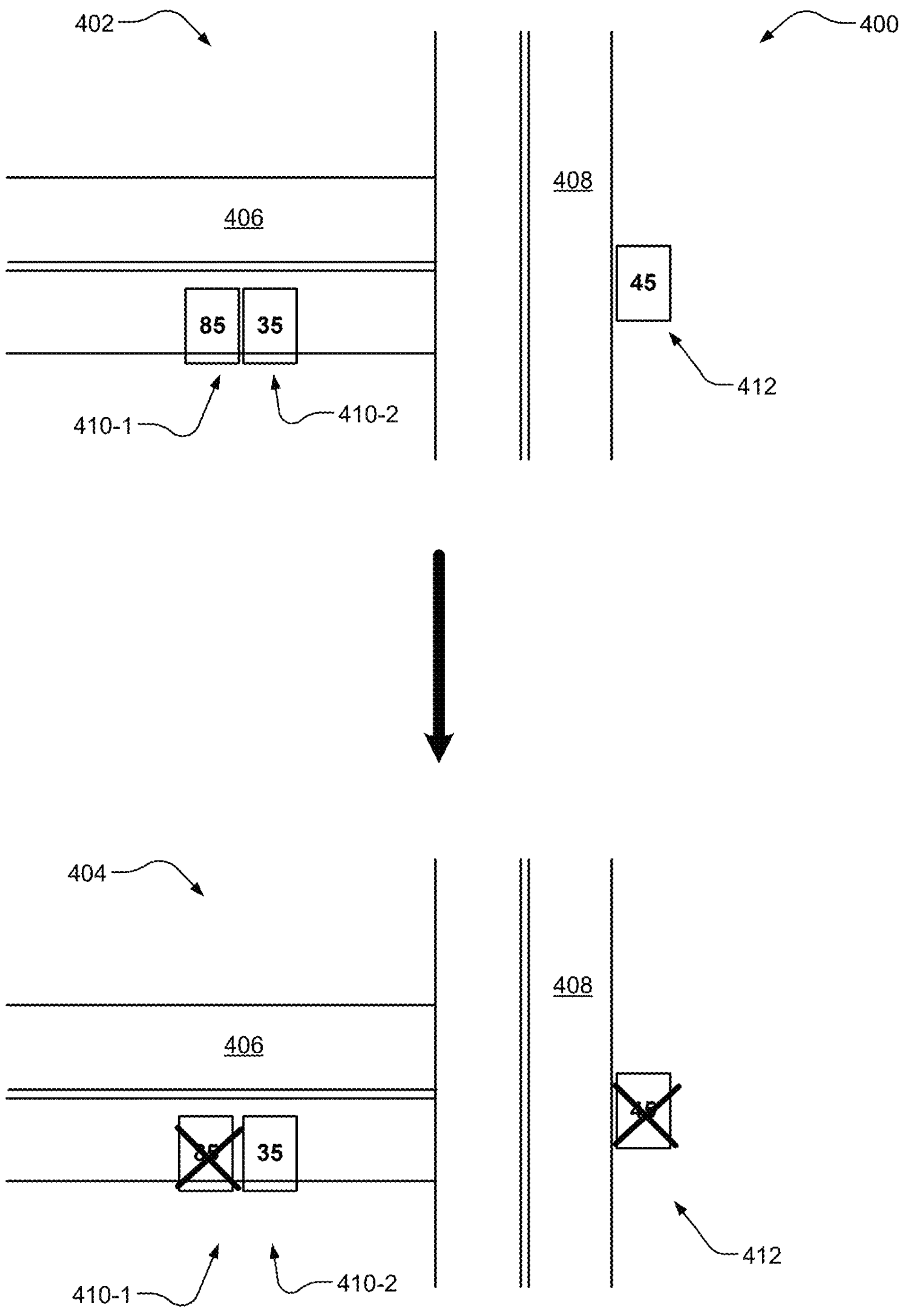
FIG. 4 is a block diagram of an example method for implementing a contradiction resolution process with the vehicle system of FIG. 1, according to the present disclosure.

For example, FIG. 4 depicts a method 400 for implementing a contradiction resolution process with the control module 102. As shown, the method 400 generally includes steps 402, 404. At step 402, the control module 102 receives data (e.g., crowdsourced data) for objects along roadways 406, 408 from multiple vehicles, such as the vehicles 104, 112, 118, 124 of FIG. 1 and/or additional vehicles if desired. The received data may include, for example, detected locations and information on the objects. The data or data sets of FIG. 4 may be collected with detection occurrences in which data is collected for specified periods of time, as explained above.

In various embodiments, the collected data may be clustered into groups (or clusters) via a conventional clustering algorithm, as explained above. Additionally, if desired, the groups (e.g., clustered data) may be analyzed with a deduplication process to detect duplicate groups and then some or all of the duplicate groups may be removed and/or merged to form a set of deduplicated groups, as explained above.

In the example of FIG. 4, the objects are speed limit signs 410-1, 410-2, 412 and the information on the objects are speed limit values. Specifically, after the collected data is clustered and a set of deduplicated groups is formed, some data indicates that the sign 410-1 has a speed limit of 85 MPH while other data indicates that the sign 410-2 has a speed limit of 35 MPH. Additionally, some data indicates that the sign 412 has a speed limit of 45 MPH.

At 404, the received data associated with the speed limit values and locations of the speed limit signs 410-1, 410-2, 412 is analyzed with a resolution process to resolve any contradictions. For example, the control module 102 may initially identify co-located signs. In this way, the data associated with the signs within a general vicinity may be considered for resolving any contradictions. For instance, the general vicinity may be determined based on, for example, whether a distance therebetween sign locations is less than a threshold, whether the sign locations are along the same side of a road, whether the sign locations are along the different roads, whether the sign locations are at a similar elevation, whether the sign locations have a matching heading, etc. In the example of FIG. 4, the signs 410-1, 410-2 are located within a general vicinity of each other and therefore can be considered with the contradiction analysis. However, the sign 412 may be removed from consideration with respect to the contradiction analysis because the sign 412 is generally outside the general vicinity of the signs 410-1, 410-2 (e.g., greater than a distance threshold, along different roadways 406, 408, etc.).

Next, the control module 102 may analyze the collected data and identify contradictions between information on the remaining, co-located signs 410-1, 410-2. For example, the control module 102 may compare portions of the collected data for one or more objects to identify contradictions. In the example of FIG. 4, the control module 102 may identify a contradiction between the co-located signs 410-1, 410-2, with some data indicating a speed limit of 85 MPH while other data indicating a speed limit of 35 MPH. Once identified, the control module 102 may utilize one or more contradiction tables for resolving the contradiction.

For example, a table may be initially set up based on transportation regulations, such as maximum speed limits for a particular region (e.g., city, county, state, etc.), roads, etc. As one example, the transportation regulations may require residential roads to have a speed limit range between 15 MPH and 50 MPH and access-controlled roadways (e.g., non-residential roads) to have a maximum speed limit of 75 MPH. As such, the table may be initially set up with such values for roads and locations stored therein. Additionally, initial outcomes (e.g., expected speed limit values), the number of contradiction occurrences, and verification status may be stored. Table 1 below is one example of a contradiction table initially set up based on transportation regulations.

TABLE 1

| Contradiction Pairs | Location | Roadway | Outcome | Occurrences | Verified |
|---|---|---|---|---|---|
| 35 MPH vs 85 MPH | (latitude, longitudinal) | Residential | 35 MPH | N/A | Yes |
| 5 MPH vs 25 MPH | (latitude, longitudinal) | Residential | 25 MPH | N/A | Yes |

Then, after the contradiction between the co-located signs 410-1, 410-2 is identified, the control module 102 may utilize the contradiction table shown above to select or otherwise determine an expected speed limit value (e.g., an outcome). For example, the control module 102 may search the contradiction table (e.g., a look-up table) for a similar pair of contradictions as the identified contradiction. For example, the identified contradiction may be 85 MPH vs 35 MPH when traveling on a residential roadway. If a similar contradiction pair is found, the control module 102 may determine whether to utilize the stored outcome as an expected speed limit value. For instance, if a similar contradiction pair is found and at the same location, the control module 102 may utilize the stored outcome as an expected speed limit value. In the example of FIG. 4, the control module 102 determines that the value of 85 MPH is a false positive and the value of 35 MPH is a true positive based on the contradiction table. As such, the speed limit of 85 contradiction table for the sign 410-1 may be removed.

In other examples, the control module 102 may implement a function for determining an expected speed limit value for the identified contradiction. For example, the control module 102 may make this determination based on the number of previous occurrences of the same contradiction at the same, the number of previous occurrences of the same contradiction at different locations, whether the outcome is verified (e.g., verified by a backend server, user verified, etc.), etc.

Additionally, in various embodiments, the contradiction table (e.g., Table 1 shown above) may be updated each time a contradiction is identified. This may improve reinforcement and confidence of the determined expected speed limit value, and help the system learn new contradicting cases. For example, Table 2 below is an example of the contradiction table updated over time. In this example, the occurrences in the table may be incremented and reported to a backend server for more verification. As shown in Table 2, the contradiction pair of 35 MPH vs 85 MPH has occurred 25 times, and the contradiction pair of 5 MPH vs 25 MPH has occurred 50 times.

TABLE 2

| Contradiction Pairs | Location | Roadway | Outcome | Occurrences | Verified |
|---|---|---|---|---|---|
| 35 mph vs 85 mph | (latitude, longitudinal) | Residential | 35 mph | 25 times | Yes |
| 5 mph vs 25 mph | (latitude, longitudinal) | Residential | 25 mph | 50 times | Yes |

In some embodiments, an identified contradiction may be unknown (e.g., not present in the contradiction table). In such examples, the control module 102 may determine an expected speed limit value of the speed limit sign based on various speed parameters, such as a typical detected speed for a particular vehicle roadway or a typical speed limit for multiple roadways of a similar type (e.g., residential roadway, access-controlled roadways, etc.). For example, the control module 102 may determine if a speed limit value of the received speed limit values (e.g., 35 MPH, 85 MPH, etc.) is within a defined threshold of a typical detected speed for a roadway (e.g., the roadway 406 of FIG. 4). If so, the control module 102 may then select that speed limit value as the expected speed limit value of the speed limit sign. In other embodiments, the control module 102 may determine if a speed limit value of the received speed limit values (e.g., 35 MPH, 85 MPH, etc.) is within a defined threshold of a typical speed limit for multiple similar roadways (e.g., the roadways 406, 408 of FIG. 4). If so, the control module 102 may then select that speed limit value as the expected speed limit value of the speed limit sign.

In various embodiments, the determined locations of the objects and/or the determined information on the objects may be utilized for vehicle control applications. For example, the control module 102 (or the control module 110) of FIG. 1 may transmit expected locations of speed limit signs and expected speed limit values of each sign to the vehicle control module 106 of the vehicle 104. Then, the vehicle control module 106 may control one or more vehicle operations of the vehicle 104 based on the sign location and speed limit value. For instance, the vehicle control module 106 may generate a control signal based on the based on the sign location and speed limit value, and then control an operation of the vehicle 104, such as a motion and/or a trajectory of the vehicle 104 based on the control signal.

Additionally, in some examples, the control module 102 (or the control module 110) may generate a map based on the determined locations of the objects and/or the determined information on the objects. In such examples, the map may be displayed on a display module in the vehicle 104, used for vehicle control, etc.

FIGS. 5-13 illustrate example control processes 500, 600, 700, 800, 900, 1000, 1100, 1200, 1300 employable by the vehicle system 100 of FIG. 1. Although the example control processes 500, 600, 700, 800, 900, 1000, 1100, 1200, 1300 are described in relation to the vehicle system 100 of FIG. 1 including the control module 102 and the vehicle control module 106, any one of the control processes 500, 600, 700, 800, 900, 1000, 1100, 1200, 1300 may be employable by another suitable system and/or module (e.g., the control module 110) of the vehicle system 100.

Figure 5:
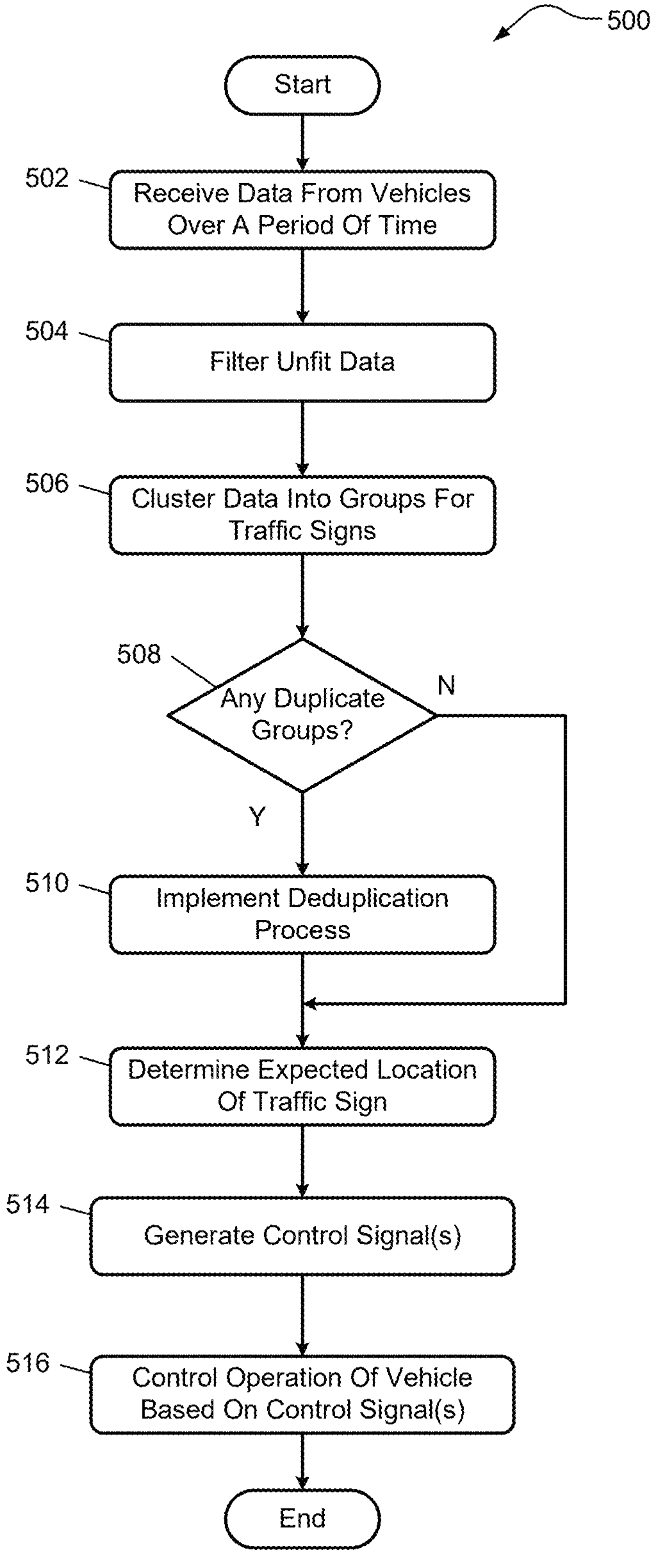
FIG. 5 is a flowchart of an example control process for deduplicating clustered groups for traffic signs along roadways and identifying expected locations of the traffic signs, according to the present disclosure.

The control process 500 is implemented for deduplicating clustered groups for traffic signs (or other suitable objects) along roadways and identifying expected locations of the traffic signs. As shown in FIG. 5, the control process 500 begins at 502 by receiving data from multiple vehicles over a period of time. For example, and as explained above, the data may be crowdsourced data collected with detection occurrences in which data is collected for specified periods of time, such as over multiple days. The control process 500 then proceeds to 504, where the control module 102 may filter out unfit data from the collected data. For example, if some data does not meet a minimum accuracy threshold or is otherwise unfit, that data may be filtered out from further processing. The control process 500 then proceeds to 506, where the control module 102 clusters the data into groups (e.g., clusters) for a traffic sign. In various embodiments, the control module 102 may implement a conventional clustering algorithm to group the data as desired. The control process 500 then proceeds to 508.

At 508, the control module 102 determines whether any duplicate groups are present in the clustered groups. For example, and as explained above, the control module 102 may compare location data in the clustered groups and determine that a group/cluster is near another group/cluster, thereby rendering the groups/clusters as duplicate groups. If yes, the control process 500 proceeds to 510. Otherwise, if no duplicate groups are present, the control process 500 proceeds to 512.

At 510, the control module 102 implements a deduplication process to resolve the duplicate groups to form a set of deduplicated groups for the traffic sign. For example, and as explained above, the control module 102 may remove one or more duplicate groups if centroids, boundaries, etc. of the duplicate groups (or clusters) are not near each other (e.g., greater than a distance threshold apart) and/or based on a determined weighted factor. Additionally, the control module 102 may merge one or more duplicate groups if centroids, boundaries, etc. of the duplicate groups (or clusters) are near each other (e.g., within a distance threshold apart). Then, after a set of deduplicated groups for the traffic sign is formed at 510, the control process 500 proceeds to 512.

At 512, the control module 102 determines an expected location of the traffic sign. For example, and as explained above, the control module 102 may implement one or more models (e.g., linear regression models, etc.) to predict an expected location of the traffic sign based on the set of deduplicated groups. The control process 500 then proceeds to 514.

At 514, the vehicle control module 106 of FIG. 1 generates one or more control signals based on the expected location of the traffic sign. For example, the control module 102 may transmit the expected location of the traffic sign to the vehicle control module 106, which then generates the control signal(s). The control process 500 then proceeds to 516, where the vehicle control module 106 controls at least one operation of the vehicle 104 based on the control signal(s).

Figure 6:
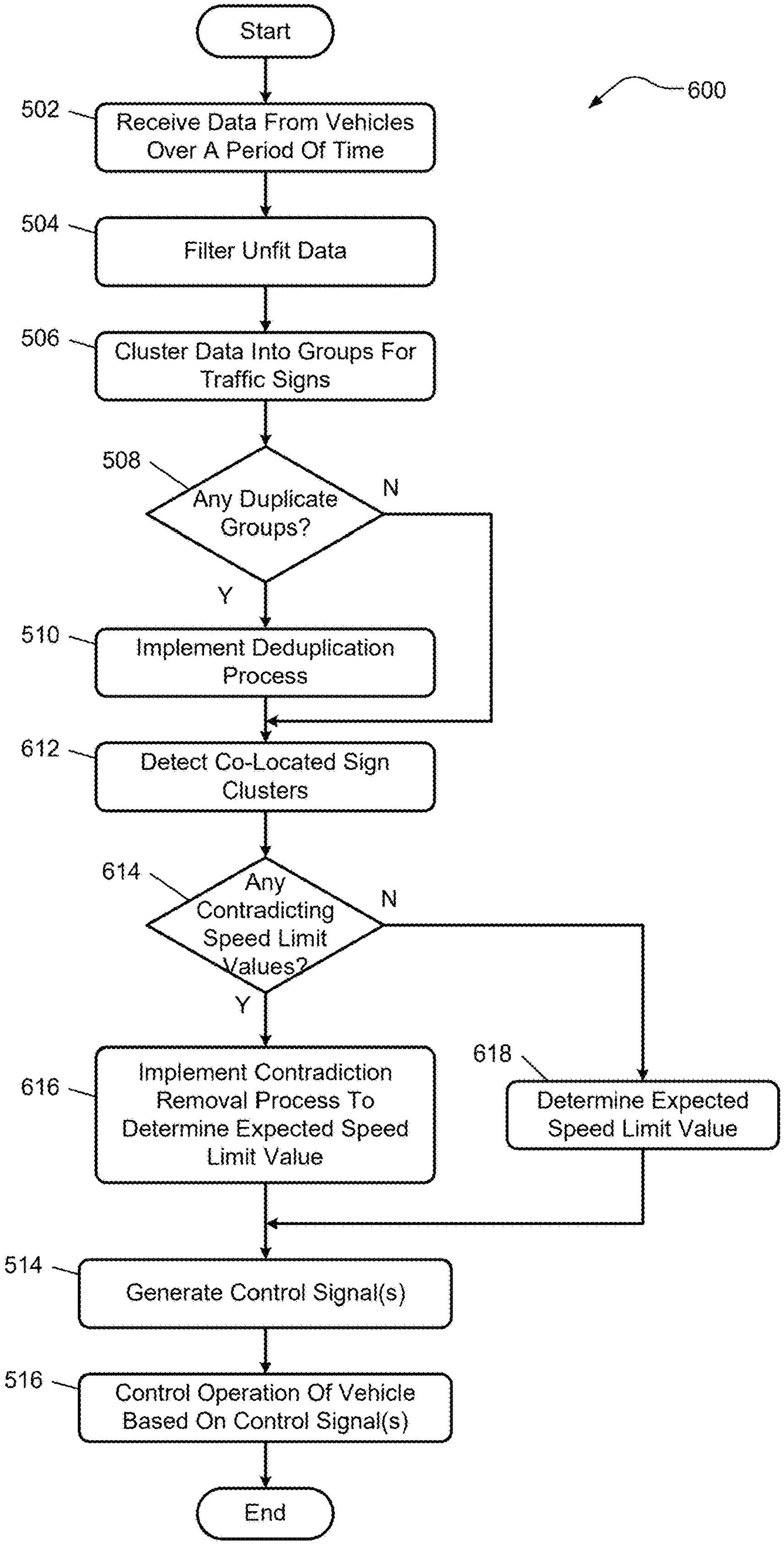
FIG. 6 is a flowchart of an example control process for identifying and resolving contradictions of traffic signs, according to the present disclosure.

The control process 600 of FIG. 6 is similar to the control process 500 of FIG. 5 but includes additional steps for identifying contradiction pairs of information of traffic signs and resolution thereof. Although the example control process 600 of FIG. 6 relates to identifying contradicting speed limits on traffic signs, it should be appreciated that the control process 600 may be employed for identifying other contradicting information on traffic signs and/or contradicting information on objects along roadways. As shown in FIG. 6, the control process 600 begins at 502 of FIG. 5, and then proceeds to 504, 506, 508, 510 of FIG. 5, all of which are explained above. Then, after a set of deduplicated groups for the traffic sign is formed at 510, the control process 600 proceeds to 612.

At 612, the control module 102 detects co-located signs associated with the set of deduplicated groups. For example, and as explained above, the control module 102 may initially identify co-located signs which are within a general vicinity of each other. Deduplicated groups with data associated with other signs outside of the general vicinity may be removed from consideration. The control process 600 then proceeds to 614.

At 614, the control module 102 determines whether any of the remaining deduplicated groups includes contradicting speed limit values for the co-located signs. For instance, and as explained above, the control module 102 may compare portions of the collected data for the co-located signs to identify contradictions. If contradicting speed limit values are identified at 614, the control process 600 proceeds to 616. Otherwise, if no contradicting speed limit values are present, the control process 600 proceeds to 618.

At 616, the control module 102 implements a contradiction removal process to resolve the identified contradicting speed limit values. For example, after the identified contradicting speed limit values, the control module 102 may utilize a contradiction table for resolving the contradiction, as explained above. Then, if the identified contradiction is a known contradiction, the control module 102 may select a contradiction outcome stored in the contradiction table as an expected speed limit at 616. Alternatively, if the identified contradiction is unknown (e.g., not present in the contradiction table), the control module 102 may determine an expected speed limit value at 616 based on various speed parameters, such as a typical detected speed for a particular vehicle roadway or a typical speed limit for multiple roadways of a similar type (e.g., residential roadway, access-controlled roadways, etc.), as explained above.

At 618, the control module 102 determines an expected speed limit value for the traffic sign when no contradicting speed limit values are present. For example, the control module 102 may implement one or more models (e.g., linear regression models, etc.) to predict an expected speed limit value based on the set of deduplicated groups.

After determining an expected speed limit value at 616 or 618, the control process 600 then proceeds to 514, 516 of FIG. 5. For example, at 514, the vehicle control module 106 generates one or more control signals based on the expected speed limit value of the traffic sign, and then at 516, the vehicle control module 106 controls at least one operation of the vehicle 104 based on the control signal(s).

Figure 7:
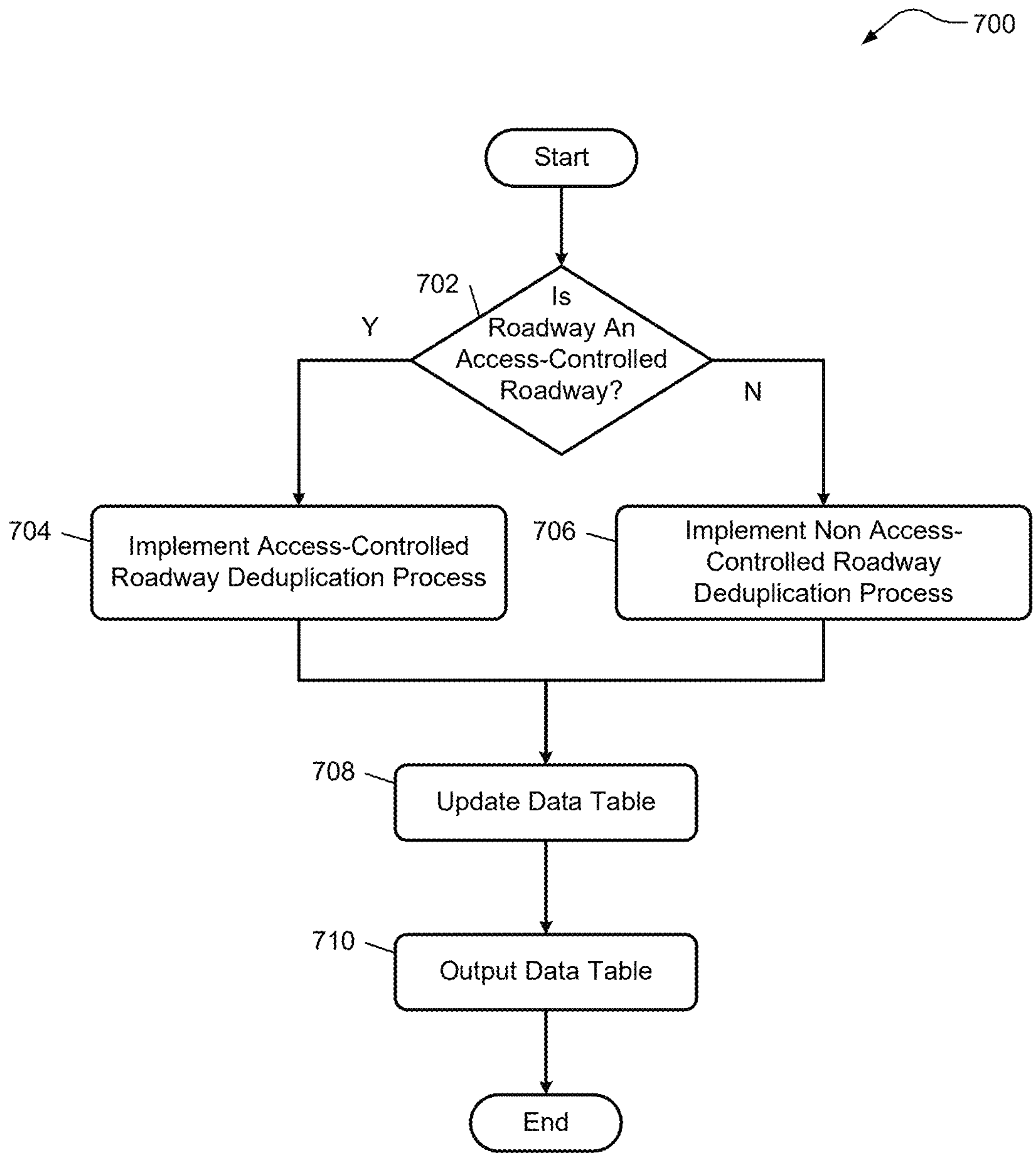
FIGS. 7-10 are flowcharts of example control processes for deduplicating clustered groups, according to the present disclosure.

The control process 700 of FIG. 7 is one example implementation of a deduplication process to resolve the duplicate groups to form a set of deduplicated groups for the traffic sign, such as in step 510 of FIG. 5. As shown in FIG. 7, the control process 700 begins at 702 by determining whether a roadway type for consideration is an access-controlled roadway. For example, the control module 102 may rely on existing maps, known data, transportation regulations, etc. to identify a roadway as an access-controlled roadway (e.g., a high-speed roadway, such as a highway, interstate, etc.) or a nonaccess-controlled roadway (e.g., a low-speed roadway, such as a residential road, etc.). If the roadway is an access-controlled roadway, the control process 700 proceeds to 704. If the roadway is not an access-controlled roadway, the control process 700 proceeds to 706.

At 704, the control module 102 implements an access-controlled roadway deduplication process to identify and resolve duplicate groups. One example of an access-controlled roadway deduplication process is the control process 800 of FIG. 8, which is described below. At 706, the control module 102 implements a nonaccess-controlled roadway deduplication process to identify and resolve duplicate groups. One example of a non access-controlled roadway deduplication process is the control process 900 of FIG. 9, which is described below. Then, after implementation of the appropriate roadway deduplication process at 704 or 706, the control process 700 proceeds to 708.

At 708, the control module 102 updates a data table to reflect the resolution of the duplicate groups. For example, the data table may be updated to remove and/or merge clustered groups. Then, the control process 700 proceeds to 710, where the updated data table is output or otherwise accessible for use in determining expected locations.

Figure 8:
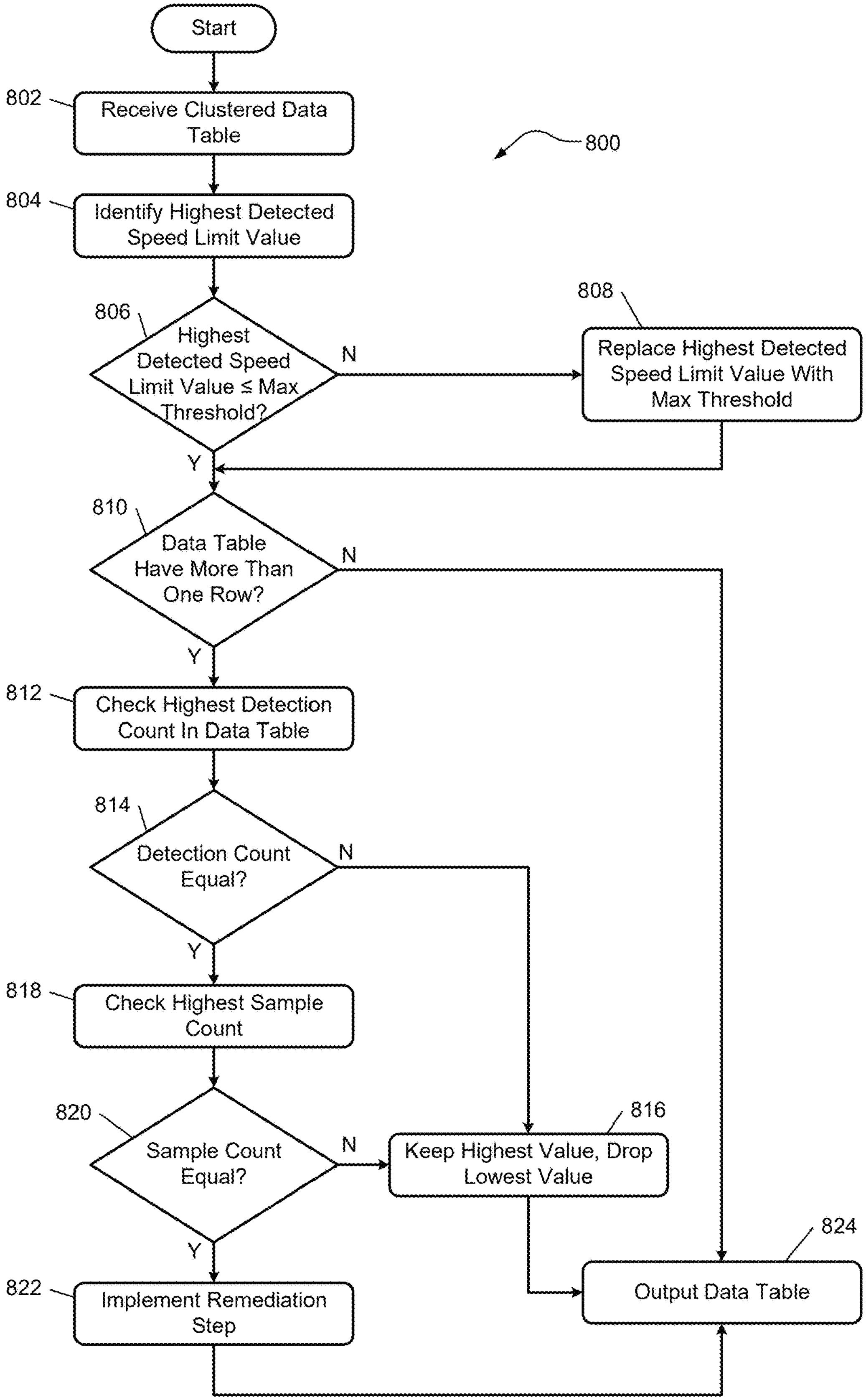

The control process 800 of FIG. 8 is one example implementation of an access-controlled roadway deduplication process to identify and resolve duplicate groups. In various embodiments, some or all of the steps of the control process 800 may be employed in 704 of FIG. 7. As shown in FIG. 8, the control process 800 begins at 802 by the control module 102 receiving or otherwise accessing a set of clustered data, such as in a clustered data table. In such examples, the clustered data table may be generated after crowdsourced data from multiple vehicles over a period of time is received and clustered into groups (or clusters), as explained above. The control process 800 then proceeds to 804.

At 804, the control module 102 identifies the highest detected speed limit value for a sign in the clustered data table. The control process 800 then proceeds to 806, where the control module 102 if the highest detected speed limit value for the sign is less than or equal to a maximum threshold. In some examples, the maximum threshold may be a maximum speed limit value for an access-controlled roadway set by a transportation regulation for a city, a county, a state, etc. As examples only, the maximum speed limit value (e.g., the maximum threshold) may be 65 MPH, 70 MPH, 75 MPH, 80 MPH, etc.

If the highest detected speed limit value for the sign is greater than the maximum threshold (no at 806), the control process 800 proceeds to 808. At 808, the control module 102 replaces the highest detected speed limit value in the clustered data table for the sign with the maximum threshold. The control process 800 then proceeds to 810.

If, however, the highest detected speed limit value for the sign is less than or equal to the maximum threshold (yes at 806), the control process 800 proceeds to 810. At 810, the control module 102 determines whether the clustered data table has more than one row of data. For example, each row in the clustered data table may include data associated with one detection occurrence for a specific time period, as explained above. When the clustered data table has one row or less (no at 810), no duplicate groups are present, or no data exists in the table. In such scenarios, the control process 800 proceeds to 824. If, however, the clustered data table has more than one row (yes at 810), the control process 800 proceeds to 812.

At 812, the control module 102 checks for or identifies the highest detection count of the detection occurrences in the clustered data table. For example, and as explained above, each detection occurrence includes a detection count representing the number of vehicle passes for a specific time period. The control process 800 then proceeds to 814, where the control module 102 determines whether the highest detection count is equal to any other detection count for another detection occurrence in the clustered data table. If no at 814, the control process 800 proceeds to 816. If yes at 814, the control process 800 proceeds to 818.

At 816, the control module 102 keeps the data set in the clustered data table associated with the detection count having the highest value and drops or removes the data set in the clustered data table associated with the detection count having the lowest value. For example, a detection count having the higher value likely has more accurate data than a detection count with a lower value. As one example, if one detection count has 35 vehicle passes while another detection count has 85 vehicle passes, the data set associated with the 85-vehicle detection count is maintained (and used) whereas the data set associated with the 35-vehicle detection count is dropped or removed. As such, the 85-vehicle detection count includes more vehicles providing data (e.g., detected locations of the sign, detected speed limit values of the sign, etc.) as compared to the 35-vehicle detection count. The control process 800 then proceeds to 824.

At 818, the control module 102 checks for or identifies the highest sample count between the equal detection counts. For example, each detection count (e.g., the number of vehicle passes) may include a different sampling frequency based on the number of samples obtained by each vehicle with each pass. For instance, one vehicle pass may collect 10 samples whereas another vehicle pass may collect 100 samples.

The control process 800 then proceeds to 820, where the control module 102 determines whether the highest sample count is equal to the sample count for the other equal detection count. If yes at 816, the control process 800 proceeds to 822. If no at 820, the control process 800 proceeds to 816. At 816, the control module 102 keeps the data set in the clustered data table associated with the sample count having the highest value and drops or removes the other data set(s) in the clustered data table associated with the detection sample having lower value(s). For example, and with continued refence to the example above, the data set in the clustered data table associated with the 100-sample count is maintained (and used) while the data set in the clustered data table associated with the 10-sample count is dropped or removed. The control process 800 then proceeds to 824.

At 822, the control module 102 implements a remediation step based on the type of data involved. For example, if the data sets of the equal sample counts (and equal detection counts) relate to detected locations of the sign, the control module 102 may determine an average of latitude values and an average of longitudinal values and update the clustered data table with this merged data. In other examples, the data sets of the equal sample counts may relate to speed limit values. In such examples, the control module 102 may initiate a contradiction identification and resolution process as explained herein, leave the data sets of the equal sample counts as is, etc. The control process 800 then proceeds to 824.

At 824, the control module 102 outputs the clustered data table with any updates created in steps 808, 816, 822. In various embodiments, the clustered data table at 824 includes the set of deduplicated groups (e.g., with no duplicated groups), as explained above. This clustered data table may then be relied upon for determining expected locations of signs (or other objects) and expected speed limit values of the signs (or other information on the signs or other subject), as explained above.

Figure 9:
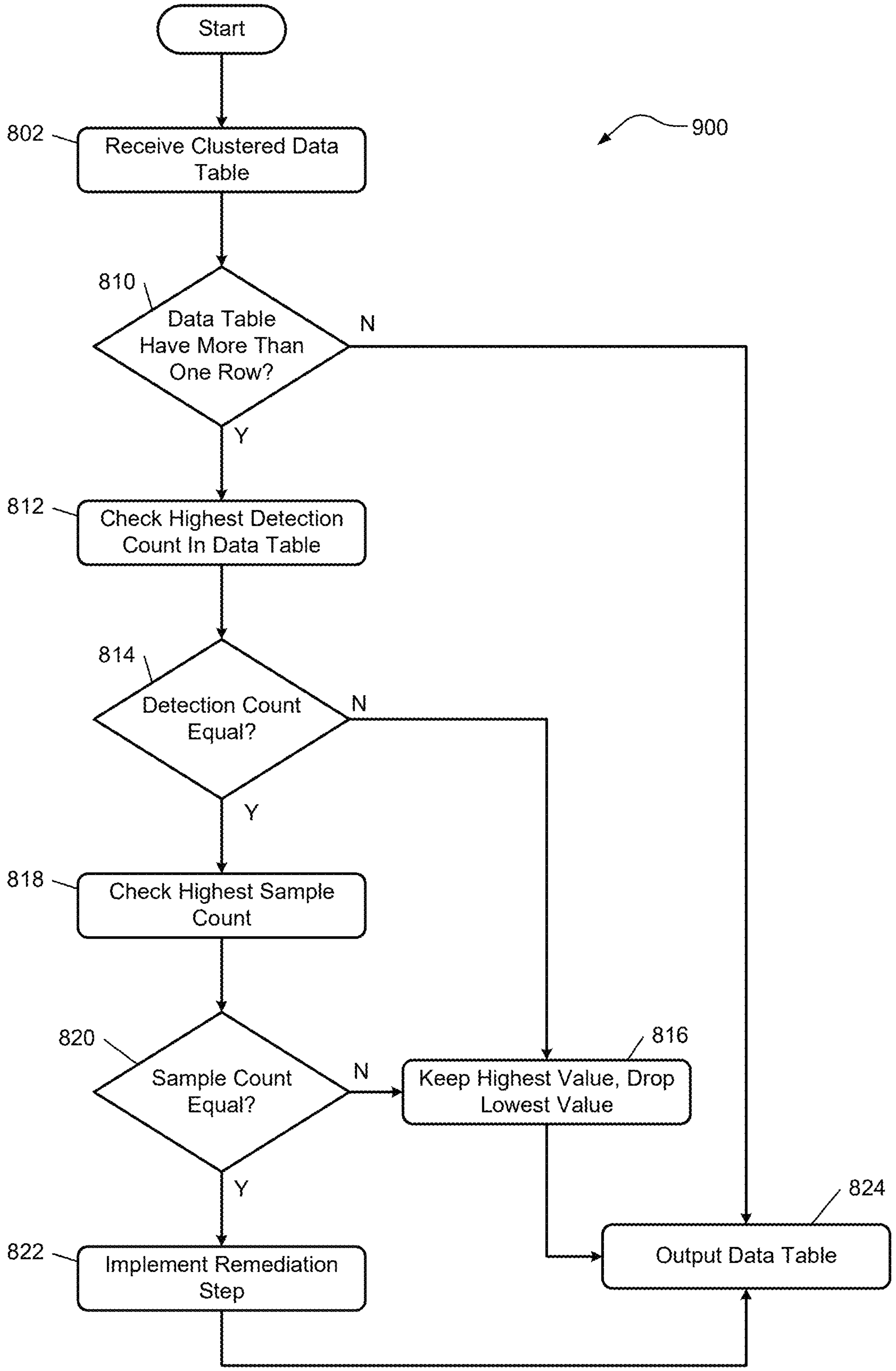

The control process 900 of FIG. 9 is one example implementation of a non access-controlled roadway deduplication process to identify and resolve duplicate groups. In various embodiments, some or all of the steps of the control process 900 may be employed in 706 of FIG. 7. The control process 900 of FIG. 9 is substantially similar to the control process 800 of FIG. 8 but includes less steps. For example, the control process 900 includes 802, 810, 812, 814, 816, 818, 820, 822, 824, as explained above relative to the control process 800 of FIG. 8.

Figure 10:
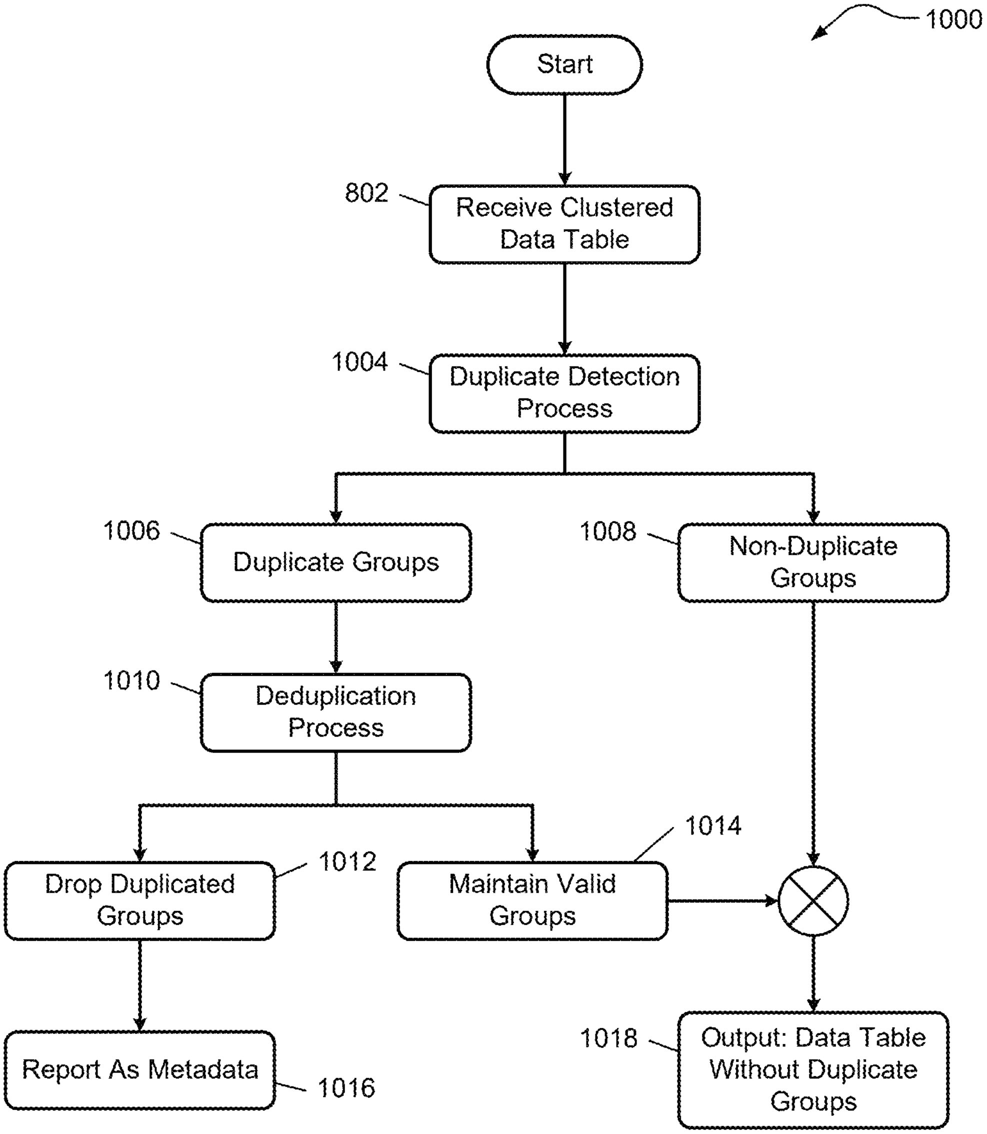

The control process 1000 of FIG. 10 is one example implementation for updating a clustered data table. As shown in FIG. 10, the control process 1000 of FIG. 10 begins at 802 with the control module 102 receiving or otherwise accessing a set of clustered data, such as in a clustered data table as explained above. The control process 1000 then proceeds to 1004, where the control module 102 implements a duplicate detection process to identify duplicate groups (or clusters) and non-duplicate groups (or clusters). The duplicate groups are shown at 1006, whereas the non-duplicate groups are shown at 1008.

Then, at 1010, the control module 102 implements a deduplication process on the duplicate groups from 1006. The deduplication process may resolve the duplicated groups by removing groups and/or merging groups together, as explained above. As such, with the deduplication process, the control module 102 may drop the duplicated groups at 1012 and maintain the valid groups (merged groups) at 1014.

Then, at 1016, the control module 102 generates and reports metadata for the dropped/duplicated groups at 1012. In other words, the control module 102 may create a record of unwanted duplicated detections of objects (e.g., signs). This metadata may be used to improve future crowdsourcing processes.

At 1018, the control module 102 generates and outputs a data table with the non-duplicate groups of 1008 and the valid groups (merged groups) of 1014. This data table may then be relied upon for determining expected locations of signs (or other objects) and expected speed limit values of the signs (or other information on the signs or other subject), as explained above.

Figure 11:
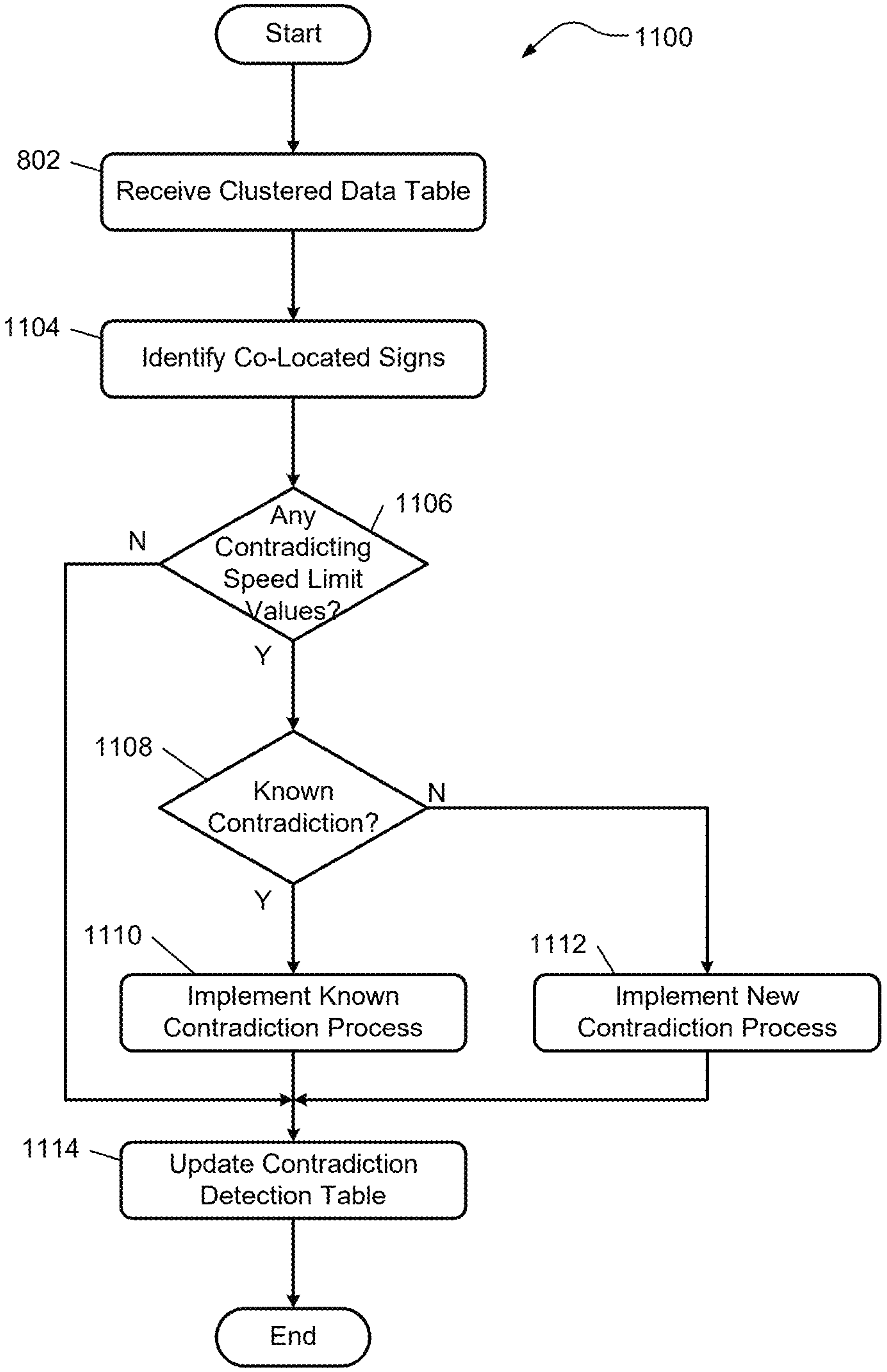
FIGS. 11-13 are flowchart of an example control process for resolving contradictions of traffic signs, according to the present disclosure.

The control process 1100 of FIG. 11 is one example implementation for identifying and resolving contradictions (e.g., false detections). As shown in FIG. 11, the control process 1100 of FIG. 10 begins at 802 with the control module 102 receiving or otherwise accessing a set of clustered data, such as in a clustered data table as explained above. The control process 1100 then proceeds to 1104, where the control module 102 analyzes the clustered data to identify co-located signs associated with, for example, a set of deduplicated groups (or clusters). For example, and as explained above, the control module 102 may initially identify co-located signs which are within a general vicinity of each other. The control process 1100 then proceeds to 1106.

At 1106, the control module 102 determines whether contradicting speed limit values are present for the co-located signs. For example, and as explained above, the control module 102 may compare portions of the collected data for the co-located signs to identify contradictions. If contradicting speed limit values are identified at 1106, the control process 1100 proceeds to 1108. If, however, no contradicting speed limit values are present, the control process 1100 proceeds to 1114.

At 1108, the control module 102 determines whether the identified contradicting speed values is a known contradiction. For example, the control module 102 may search a contradiction table with known contradictions to see if the identified contradicting speed values is known. If the contradicting speed values is a known contradiction, the control process 1000 proceeds 1110 where the control module 102 implements a contradiction resolution process for a known contradiction to resolve the contradicting speed values, as explained above. Otherwise, if the contradicting speed values is an unknown contradiction, the control process 1000 proceeds 1112 where the control module 102 implements a contradiction resolution process for a new contradiction to resolve the contradicting speed values, as explained above. Then, after the contradiction resolution process for a known or unknown contradiction is completed, the control process 1100 proceeds to 1114.

At 1114, the control module 102 updates the contradiction table to reflect the resolution of the contradicting speed values. For instance, the contradiction may be added if previously unknown, an occurrence of a known contradiction may be incremented, etc. In some examples, the incrementation of the occurrences may provide a reinforcement or stronger confidence of a contradiction resolution (e.g., a selection of one of the contradicting speed values) in the future processes.

Figure 12:
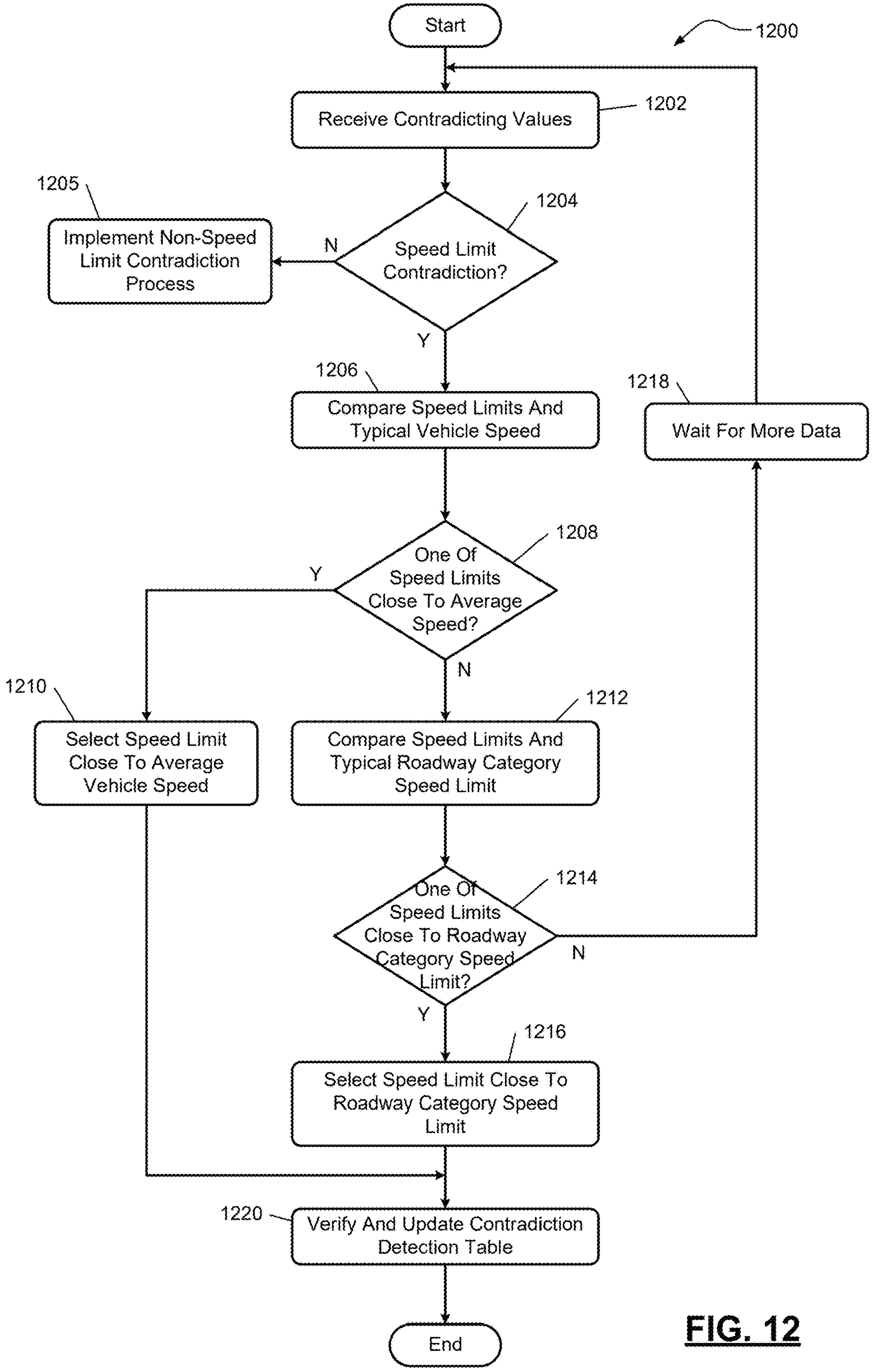

The control process 1200 of FIG. 12 is one example of a contradiction resolution process for a new contradiction. In various embodiments, some or all of the steps of the control process 1200 may be employed in 1112 of FIG. 11. As shown, the control process 1200 of FIG. 12 begins at 1202 where the control module 102 receives or accesses new (or unknown) contradicting values. The control process 1200 then proceeds to 1204. At 1204, the control module 102 determines whether the contradicting values are speed limit contradictions. If no, the control process 1200 proceeds to 1205 where the control module 102 may implement a non-speed limit contradiction process. One example of such a contradiction process is the control process 1300 of FIG. 13, which is described below. In other examples, the control process 1200 may end if desired. If yes at 1204, the control process 1200 proceeds to 1206, 1208.

At 1206, the control module 102 compares each contradicting speed limit value and a typical vehicle speed for a roadway associated with the contradicting values. For example, the typical vehicle speed may be an average vehicle speed, a vehicle speed at the 85th percentile, etc. Then, at 1208, the control module 102 determines whether one of the contradicting speed limit values is near the typical vehicle speed. For example, the control module 102 may determine whether a difference between one of the contradicting speed limit values and the typical vehicle speed is less than a threshold. If yes, the control process 1200 proceeds to 1210, where the control module 102 selects the contradicting speed limit value that is near the typical vehicle speed as an expected speed limit value of the speed limit sign. The control process 1200 then proceeds to 1220.

If no at 1208, the control process 1200 proceeds to 1212, 1214. At 1212, the control module 102 compares each contradicting speed limit value and a typical roadway category speed limit associated with the corresponding roadway along which the signs are located. For example, the control module 102 may compare the contradicting speed limit values and a typical speed for similar roadways, such as an average speed for highways, an average speed for residential roads, etc. Then, at 1214, the control module 102 determines whether one of the contradicting speed limit values is near the typical roadway category speed limit. For example, the control module 102 may determine whether a difference between one of the contradicting speed limit values and the typical speed limit is less than a threshold. If no, the control process 1200 proceeds to 1218, where control waits for more data. The control process 1200 then returns to 1202. If yes at 1214, the control process 1200 proceeds to 1216, where the control module 102 selects the contradicting speed limit value that is near the typical speed limit as an expected speed limit value of the speed limit sign. The control process 1200 then proceeds to 1220.

At 1220, the control module 102 verifies the selected expected speed limit value with, for example, a backend server, a user, etc., and then updates a contradiction table to include the new contradiction speed values and an outcome (e.g., the expected speed limit value).

At 1220, the control module 102 verifies the selected expected speed limit value with, for example, a backend server, a user, etc., and then updates a contradiction table to include the new contradiction speed values and an outcome (e.g., the expected speed limit value).

Figure 13:
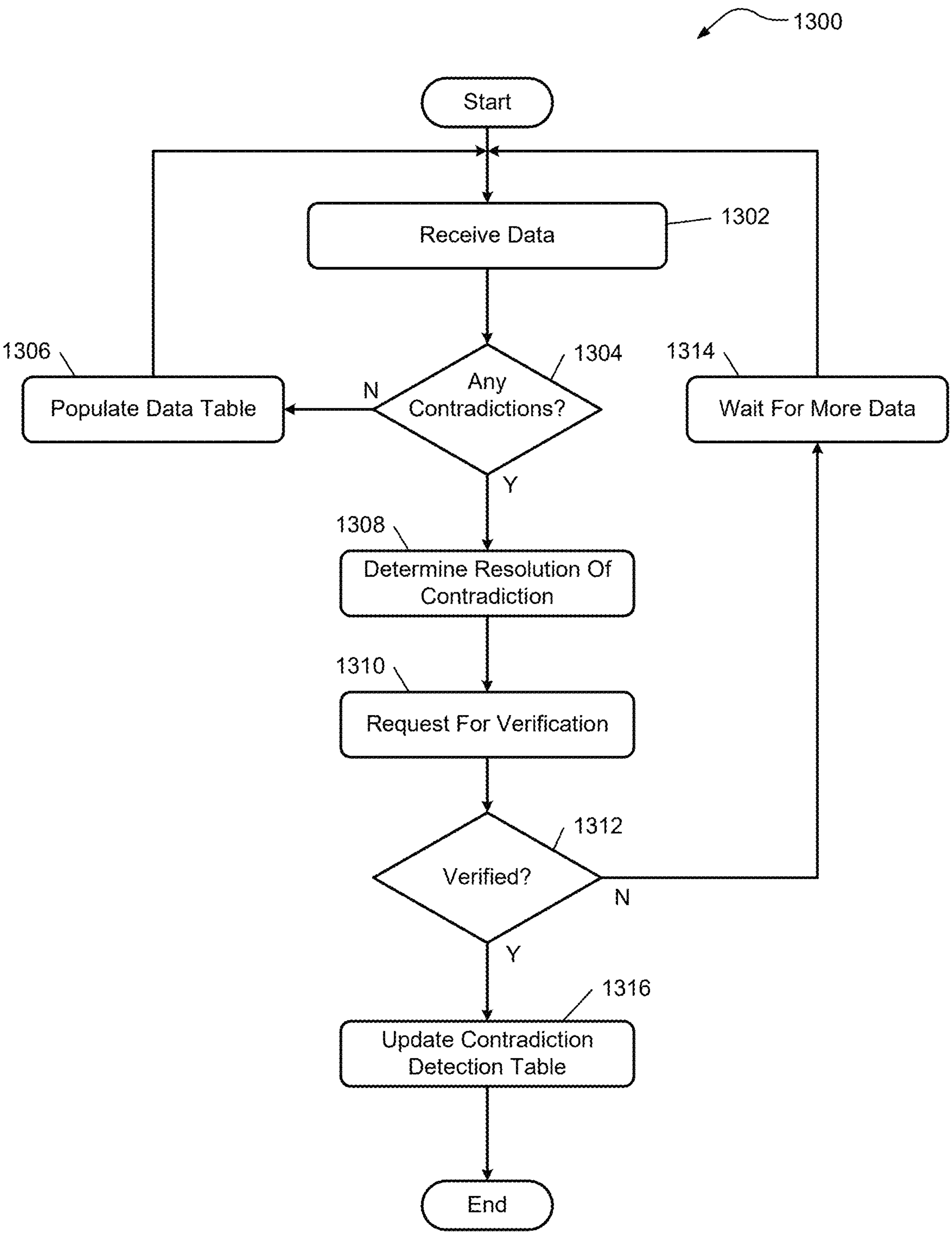

The control process 1300 of FIG. 13 is one example of a contradiction resolution process for a new contradiction. In various embodiments, some or all of the steps of the control process 1300 may be employed in 1112 of FIG. 11. As shown, the control process 1300 of FIG. 13 begins at 1302 where the control module 102 receives or accesses clustered data. The control process 1300 then proceeds to 1304, where the control module 102 determines whether the clustered data includes any contradictions for an object.

If no at 1304, the control process 1300 proceeds to 1306. At 1306, the control module 102 populates a data table with the non-contradicting values for subsequent use (e.g., in vehicle control applications, etc.). Then, the control process 1300 returns to 1302.

If yes at 1304, the control process 1300 proceeds to 1308. At 1308, the control module 102 determines a resolution of the contradiction, as explained herein. Then, the control process 1300 proceeds to 1310, where the control module 102 sends a request for verification of the determined resolution of the contradiction with, for example, a backend server, a user, etc. The control process 1300 then proceeds to 1312. At 1312, the control module 102 determines whether the determined resolution of the contradiction is verified. If no, the control process 1300 proceeds to 1314, where control waits for more data. The control process 1300 then returns to 1302. If yes at 1312, the control process 1300 proceeds to 1316. At 1316, the control module 102 updates a contradiction table to include the new contradictions and an outcome (e.g., the verified resolution of the contradiction).

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, JavaScript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A vehicle system comprising:

a vehicle control module of a vehicle; and a control module in communication with the vehicle control module, the control module configured to:

receive data from a plurality of vehicles over a period of time, the data including detected locations of at least one object along a vehicle roadway;

cluster the received data into a plurality of groups;

detect at least one set of duplicate groups of the plurality of groups;

remove at least one of the duplicate groups from the set of duplicate groups based on sampling frequencies of the plurality of vehicles detecting locations of the at least one object, the sampling frequencies representing a number of samples per vehicle of the at least one object at the detected locations;

merge at least two of the remaining duplicate groups into a single group to form a set of deduplicated groups associated with the at least one object; and determine an expected location of the at least one object based on the set of deduplicated groups, wherein the vehicle control module is configured to:

receive the expected location of the at least one object; and generate a control signal for controlling at least one operation of the vehicle based on the expected location of the at least one object.

2. The vehicle system of claim 1, wherein the control module is configured to merge the duplicate groups into the single group by averaging latitude values and longitude values.

3. The vehicle system of claim 1, wherein the control module is configured to remove the at least one of the duplicate groups based on a number of the plurality of vehicles detecting locations of the at least one object.

4. The vehicle system of claim 1, wherein the control module is configured to determine a weighted value associated with each group from the set of duplicate groups and remove the at least one of the duplicate groups based on the weighted value and a threshold.

5. The vehicle system of claim 4, wherein the weighted value associated with each group is based on a standard deviation of locations of the object specific to the group, a standard deviation of headings of the object specific to the group, and a standard deviation of elevations of the object specific to the group.

6. The vehicle system of claim 1, wherein the at least one object is a traffic sign and the data includes information on the traffic sign.

7. The vehicle system of claim 6, wherein:

the information on the traffic sign includes speed limit values; and the control module is configured to identify a contradiction between one or more of the speed limit values of the traffic sign; and determine an expected speed limit value based on a number of previous contradictions for the traffic sign.

8. The vehicle system of claim 6, wherein:

the information on the traffic sign includes speed limit values; and the control module is configured to determine if a speed limit value of the speed limit values is within a defined threshold of a typical detected speed for the vehicle roadway; and select the speed limit value as an expected speed limit value of the speed limit sign.

9. The vehicle system of claim 6, wherein:

the information on the traffic sign includes speed limit values; and the control module is configured to determine if a speed limit value of the speed limit values is within a defined threshold of a typical speed limit for a plurality of roadways including the vehicle roadway; and select the speed limit value as an expected speed limit value of the speed limit sign.

10. The vehicle system of claim 1, wherein:

the control module is external to the vehicle; and the control module is configured to transmit the expected location of the at least one object to a plurality of vehicle control modules including the vehicle control module.

11. A vehicle system comprising:

a vehicle control module of a vehicle; and a control module in communication with the vehicle control module, the control module configured to:

receive data from a plurality of vehicles over a period of time, the data including detected locations and speed limit values of at least one speed limit sign along a vehicle roadway;

cluster the received data into a plurality of groups;

detect at least one set of duplicate groups of the plurality of groups;

remove at least one of the duplicate groups from the set of duplicate groups based on sampling frequencies of the plurality of vehicles detecting locations of the speed limit sign, the sampling frequencies representing a number of samples per vehicle of the speed limit sign at the detected locations;

merge at least two of the remaining duplicate groups into a single group to form a set of deduplicated groups associated with the at least one speed limit sign;

determine an expected speed limit value of the at least one speed limit sign based on the set of deduplicated groups;

determine an expected location of the at least one speed limit sign based on the set of deduplicated groups; and transmit the expected speed limit value and the expected location of the at least one speed limit sign to the vehicle control module, wherein the vehicle control module is configured to generate a control signal for controlling at least one operation of the vehicle based on the expected speed limit value and the expected location of the at least one speed limit sign.

12. The vehicle system of claim 11, wherein the control module is configured to identify a contradiction between one or more of the received speed limit values of the at least one speed limit sign.

13. The vehicle system of claim 12, wherein the control module is configured to determine the expected speed limit value based on a number of previous contradictions for the at least one speed limit sign.

14. The vehicle system of claim 13, wherein the control module is configured to:

determine if a speed limit value of the received speed limit values is within a defined threshold of a typical detected speed for the vehicle roadway; and select the speed limit value as the expected speed limit value of the at least one speed limit sign.

15. The vehicle system of claim 11, wherein the control module is configured to:

determine if a speed limit value of the received speed limit values is within a defined threshold of a typical speed limit for a plurality of roadways including the vehicle roadway; and select the speed limit value as the expected speed limit value of the at least one speed limit sign.

16. A vehicle control method comprising:
receiving data from a plurality of vehicles over a period of time, the data including detected locations of at least one object along a vehicle roadway;
clustering the received data into a plurality of groups;
detecting at least one set of duplicate groups of the plurality of groups;
removing at least one of the duplicate groups from the set of duplicate groups based on sampling frequencies of the plurality of vehicles detecting locations of the at least one object, the sampling frequencies representing a number of samples per vehicle of the at least one object at the detected locations;
merging at least two of the remaining duplicate groups into a single group;
determining an expected location of the at least one object based on the set of deduplicated groups; and
generating a control signal for controlling at least one operation of a vehicle based on the expected location of the at least one object.

17. The vehicle control method of claim 16, wherein merging the duplicate groups into the single group includes averaging latitude values and longitude values for the duplicate groups.

18. The vehicle control method of claim 16, wherein removing the at least one of the duplicate groups includes removing the at least one of the duplicate groups based on a number of the plurality of vehicles detecting locations of the at least one object.

19. The vehicle control method of claim 16, wherein removing the at least one of the duplicate groups includes:
determining a weighted value associated with each group from the set of duplicate groups, the weighted value associated with each group is based on a standard deviation of locations of the object specific to the group, a standard deviation of headings of the object specific to the group, and a standard deviation of elevations of the object specific to the group; and
removing the at least one of the duplicate groups based on the weighted value and a threshold.

20. The vehicle control method of claim 16, wherein the at least one object is a speed limit sign and the data includes speed limit values of the speed limit sign.

* * * * *